United States Patent [19]

McJunkin, Jr.

[11] 4,340,206

[45] Jul. 20, 1982

[54] CLAMP FOR REPAIR OF SEPARATION IN CONVEYOR BELT

[75] Inventor: Howard P. McJunkin, Jr., Charleston, W. Va.

[73] Assignee: McJunkin Corporation, Charleston, W. Va.

[21] Appl. No.: 198,810

[22] Filed: Oct. 20, 1980

[51] Int. Cl.³ ............................................. B25B 25/00
[52] U.S. Cl. ................................ 254/199; 24/134 L; 24/250; 29/283; 269/238; 294/104
[58] Field of Search ............... 254/248, 250, 251, 252, 254/253, 254, 255, 256, 199, 211, 232–236; 294/104, 101, 132, 133, 134, 135; 29/283; 24/134 L, 250 R; 269/238

[56] References Cited

U.S. PATENT DOCUMENTS

| | | | |
|---|---|---|---|
| 481,179 | 8/1892 | Klein . | |
| 960,201 | 5/1910 | Rudy, Jr. | 254/233 |
| 2,308,485 | 1/1943 | Bass | 294/104 |
| 2,360,601 | 10/1944 | Waldrup | 294/104 |
| 2,864,582 | 12/1958 | Hall | 294/135 X |
| 3,150,895 | 9/1964 | Lehre | 294/101 X |
| 3,955,810 | 5/1976 | Travis | 269/238 |
| 3,972,105 | 8/1976 | Miller et al. | 29/283 |

Primary Examiner—Billy S. Taylor
Attorney, Agent, or Firm—Cushman, Darby & Cushman

[57] ABSTRACT

The present invention provides a tension-setting edge clamp with an improved linkage and an improved anchor point location so that when in use in sets of pairs, to pull broken belt ends toward one another for reconnection, wherein the anchor point for the center of pull on each clamp is aligned with the center of the clamping jaws of the same clamp, to minimize belt twisting, yet not interfere with the site of the adjoining broken edges. This eliminates a cause of belt rupture and tearing, yet provides space for the reconnection to be made.

5 Claims, 13 Drawing Figures

DISTORTION IN THIS AREA AND/OR TEARING INITIATING NEAR POINT "R"

CLAMP FOR REPAIR OF SEPARATION IN CONVEYOR BELT

BACKGROUND OF THE INVENTION

The present invention arose in the coal mining equipment industry.

Figure 1:
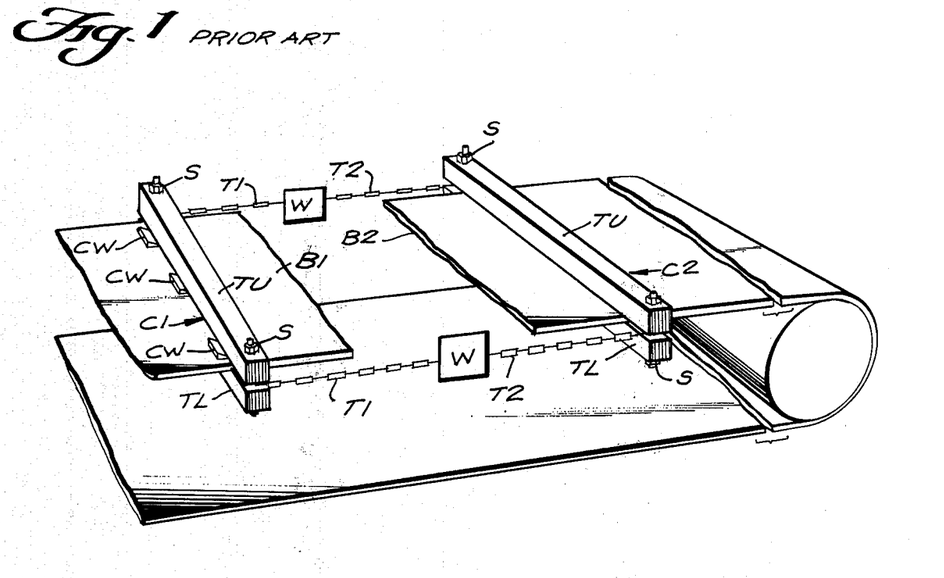
FIG. 1 is a perspective view of a broken conveyor belt being repaired in situ in a low seam underground coal mine by a classical PRIOR ART technique.

As schematically shown in FIG. 1, when a coal-carrying conveyor belt rips transversally or separates at a seam, usually the severed ends move away from one another several feet in the moments of trauma following the accident.

In overcoming the problem represented by a broken belt laden with coal, generally it is essential that an in situ repair be undertaken and performed, even if the repair will be good only long enough to let the coal on the belt be conveyed out. Then, a replacement or more permanent repair can be made under less stressful and awkward conditions. Sometimes it is possible to make the in situ repair a permanent one.

One of the important initial tasks when undertaking an in situ repair is to bring the spread-apart severed ends of the belt back into alignment and abutment or adjacency.

In order to accomplish this task a succession of decreasingly make-shift clamp devices have been devised.

In the classical prior art, which continues to be practiced in many mines even today, adjacent each broken end B1, B2 of the belt B, the respective belt end is sandwiched between an upper timber TU and a lower timber TL oriented one over the other crosswise to the run of the belt. The timbers are longer than the belt is broad, so the ends of each timber extend beyond the belt edges. Laterally outwardly of each side of the belt, at each broken end B1, B2, securement means S, such as studs or cap screws are vertically installed through superimposed holes through the respective timbers. These are fastened and made tight with the aid of respective nuts and flat washers, to provide full width clamps C1, C2, for the respective belt ends B1, B2.

To prevent slippage of the timbers of the clamps, cap wedges CW are driven between the timber and the belt, as needed. (Cap wedges are generally on hand anyway for use at the top of mine roof support timbers.)

Clamp C1 is then lashed to Clamp C2 by tensile means T1, T2 such as chains, cables, block and tackle, etc. and one is pulled toward the other using pulling means W, e.g. a portable winch or hoist, to or mobile equipment which can pull on the tensile means T1, T2. Sometimes both tensile means T1, T2 are attached to the same pulling device, and other times one pulling device is pulling on T1 in one direction and another is pulling on T2 in the other.

The beauty of the above arrangement is that usually, when a belt breaks, all the parts needed to make and install the clamps C1 and C2, and the pulling means can be cobbled together from whatever is close at hand.

However, especially in a low seam in an underground mine, where space is at a premium it is awkward trying to assemble, install and use such full width clamps made of timber and hardware. Other, made for the purpose, full width clamps are fine for making above ground repairs, but are at least as awkward to use in low seam coal. Not only are they cumbersome to use because of their bulk, but they have to be carried to the site of the break, and their bulk and weight are against them for this reason also.

In response to the need for something more convenient to carry and use, edge clamp sets were developed, with four individual clamps to a set. A prior art clamp of this type is shown by itself in FIG. 2, and the set is shown installed and in use in FIG. 3. Each clamp CL1, CR1, CL2, CR2 has a set of jaws JU, JL which grip a respective marginal edge portion of the belts near the respective belt broken ends.

Figure 2:
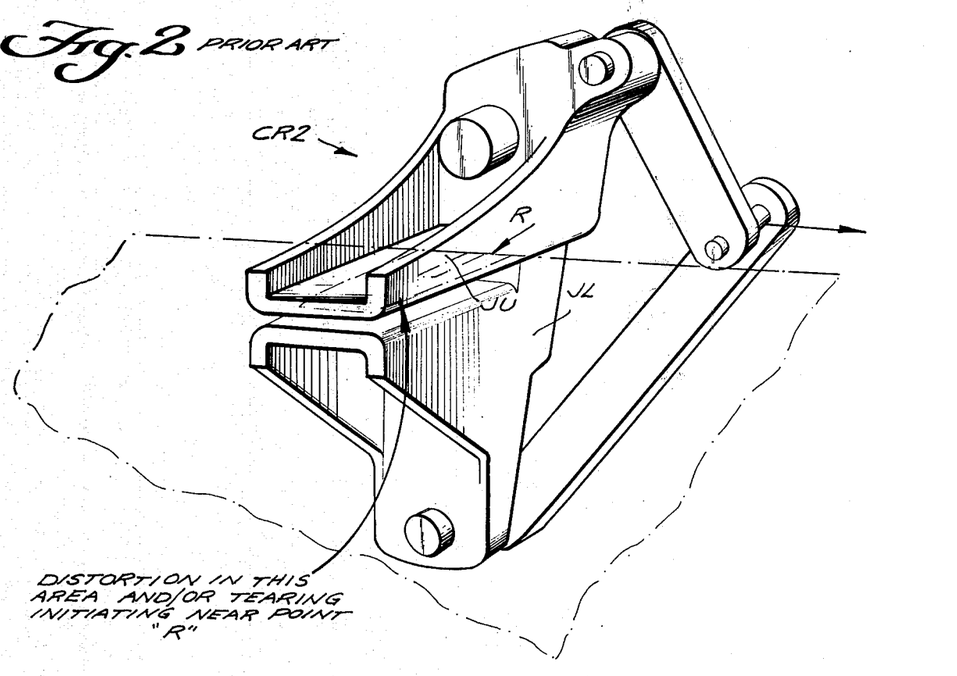
FIG. 2 is a perspective view showing a single self-setting, edge-type clamp of the more recent PRIOR ART useful for the same purpose.
Figure 3:
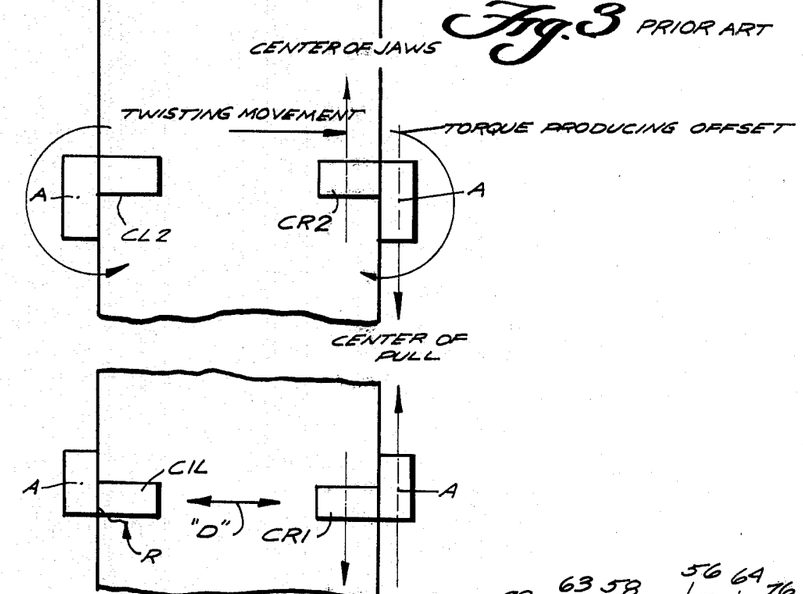

Each of these clamps has an anchor point A to which the respective chain T end attaches for the pulling operation. Although these prior art edge clamps have been well received, some users have complained that all too often, when a sufficient tension is pulled on the chains to get the broken belt ends moving back toward one another, one or more of marginal edge portions of the belt will rip next to its edge clamp. The relative location where a rip generally developes is indicated next to the clamp C1L by the line R.

Figure 4:
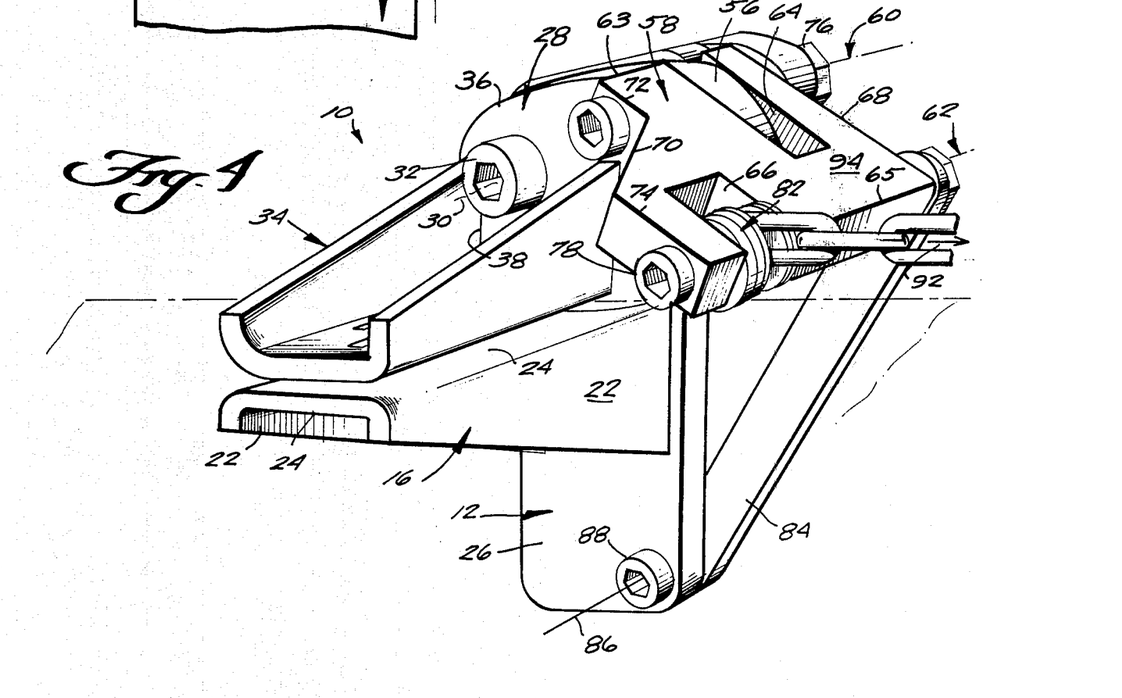
FIG. 4 is a perspective view, for comparison with FIG. 2 of a single self-setting edge-type clamp of the present invention.
Figures 5, 6:
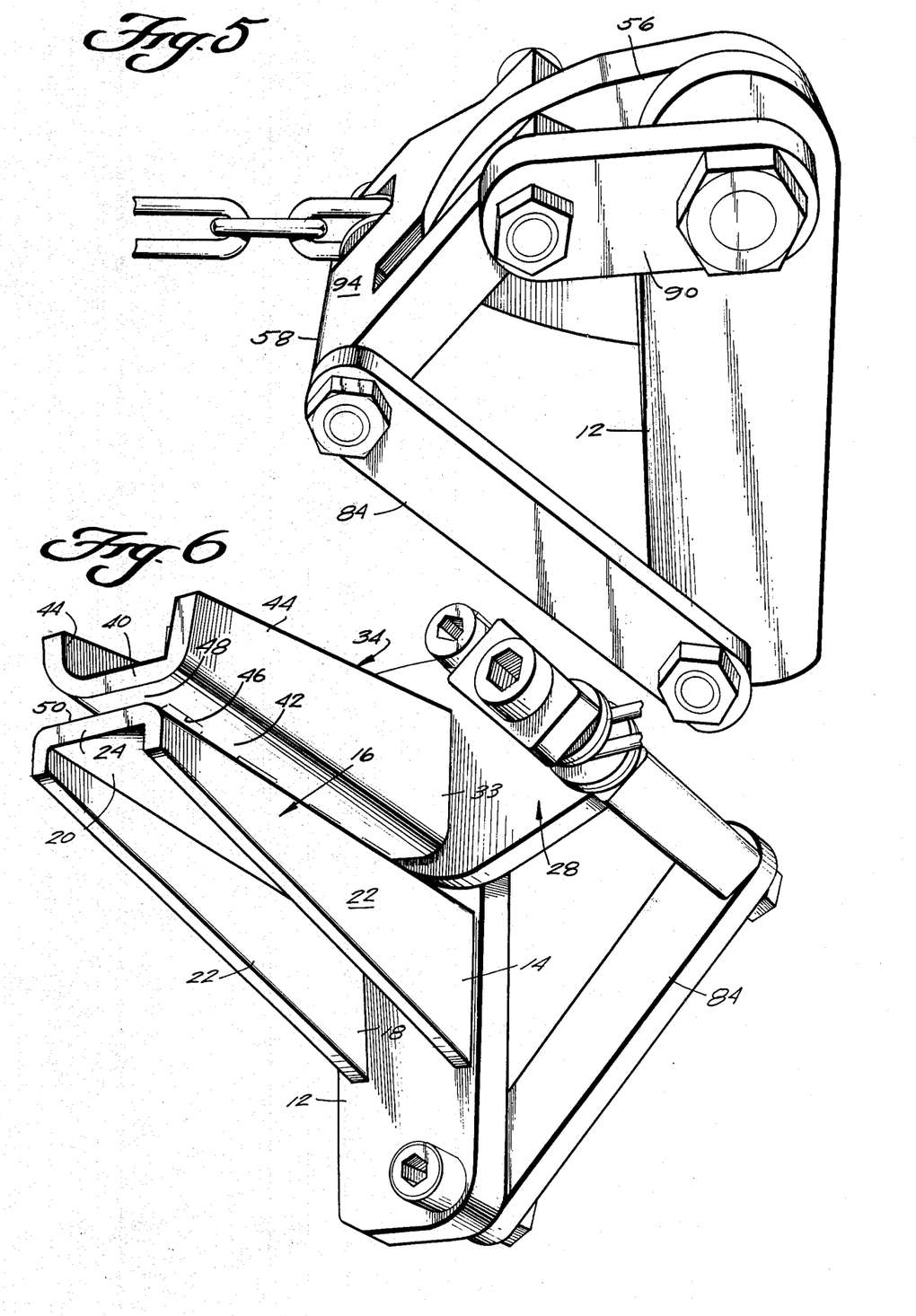
FIG. 5 is a second perspective view thereof.
FIG. 6 is a third perspective view thereof.
Figure 7:
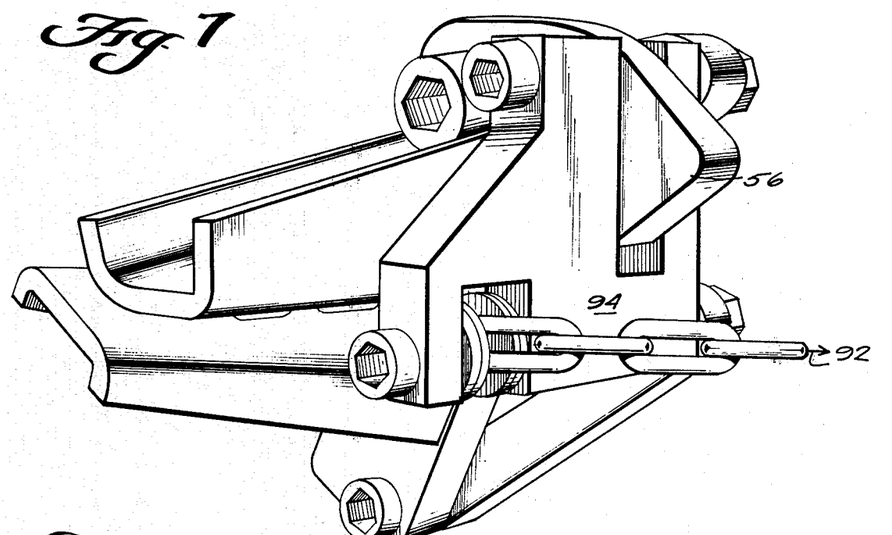
FIG. 7 is a fourth perspective view thereof, showing the jaws in an open condition.

The present inventor has studied the prior art clamp of FIGS. 2 and 3, and believes he has discovered what causes the belt rips to occur. His reasoning is presented graphically in FIG. 4. In brief, in this prior art clamp, the site where the jaw set JU/JL grips the respective marginal edge of the belt is laterally offset from the anchor point A of the clamp. So that when the chain is attached for pulling the resulting torque tends to concentrate a ripping force at R. Clearly, the shorter the jaw-contact "footprint" is in the lateral direction D, the less will be the ripping torque for any given pulling force on the anchor point A of the respective clamp. For this reason, the ideal prior art clamp of this type has zero length jaws. In the actual clamps of this type, the provision of jaws of a finite length is a compromise from zero length, which walks a fine line between being so long as to cause belt twisting and tearing and being so short as to have insufficient clamping area to apply the clamping force without generating excessive compressive stress in the belt under load.

A clamp that is a particular variation of the one shown in FIGS. 2 and 3 is shown in the prior U.S. Pat. No. of Travis, 3,955,810, issued May 11, 1976.

SUMMARY OF THE INVENTION

The present invention provides a tension-setting edge clamp with an improved linkage and an improved anchor point location so that when in use in sets of pairs, to pull broken belt ends toward one another for reconnection, wherein the anchor point for the center of pull on each clamp is aligned with the center of the clamping jaws of the same clamp, to minimize belt twisting, yet not interfere with the site of the adjoining broken edges. This eliminates a cause of belt rupture and tearing, yet provides space for the reconnection to be made.

The principles of the invention will be further discussed with reference to the drawings wherein a preferred embodiment is shown. The specifics illustrated in the drawings are intended to exemplify, rather than limit, aspects of the invention as defined in the claims.

BRIEF DESCRIPTION OF THE DRAWINGS

In the Drawings

FIG. 3 is a diagrammatic plan view of a broken coal conveyor belt being repaired using a set of two pairs of the PRIOR ART clamps of FIG. 2 to practice a PRIOR ART process to pull the broken ends back into adjacency so that a reconnection can be made using any technique, such as stapling, riveting, sewing, patching, battening, splicing or the like.

DETAILED DESCRIPTION (For convenience in the description, the longitudinal direction along a conveyor belt from both extremes of the run of the belt in which the break has occurred, towards the break will be termed longitudinally inwards.)

The clamp 10 includes a generally vertically oriented outer edge bracket 12, to which the laterally outer base end 14 of a first, preferably lower, upwardly facing jaw 16 is fixed, e.g. by welding as at 18. The jaw 16 is generally inverted U-shaped in transverse cross-sectional figure, so that it has a relatively broad, flat generally horizontal web 20, with two flanking brace webs 22, which taper in vertical extensiveness, from the base end 14 out to the laterally inner free end 24.

The outer edge bracket 12 is shown being generally bar-shaped, with the jaw securement at 18 being located generally at the top of the lower half of the outer edge bracket 12, on the laterally inner face 26 thereof.

The clamp 10 further includes a crank link plate 28 pivotally secured to the outer edge bracket bar 12 near the upper end of the latter, so as to have a horizontally, laterally-oriented pivot axis 30, e.g. provided by a nut, bolt and washer assembly 32 installed through corresponding openings in the crank link plate 28 and the outer edge bracket bar 12. Accordingly, the crank link plate 28 is located laterally to the inside of the outer edge bracket bar and mounted for arcuate movement about the pivot axis 30. The laterally outer base end 33 of a second, preferably upper, downwardly facing jaw 34 is secured on the laterally inner face 36 of the crank link plate 28, e.g. by welding as at 38. The jaw 34 has generally the same shape as the jaw 16, but is shorter-based laterally by the same amount that the face 36 is located laterally inwardly from the face 26, so that the laterally inner free end 24 of the jaw 16 is laterally aligned with the laterally inner end 40 of the jaw 34. Accordingly, the jaw 34 has a portion 42, which is generally horizontal when the clamp is closed, and two flanking brace portions 44.

The pivot axis 30 is assymetrical relative to the length of the flat central portion of the jaw 34 being located longitudinally somewhat outwardly of the plane of symmetry of the jaw 34. Accordingly, as the jaw 34 swings to open, it moves upwardly and longitudinally inwardly, and then it pivots to close, the jaw 34 swings downwardly and longitudinally outwardly.

When the clamp is fully closed, the jaw 34 is vertically superimposed upon the jaw 16, e.g. with only the vertical spacing needed to accommodate knurling or other gripping surface means 46 which preferably are disposed on the surface 48 of the central web 42 of the jaw 34 for confrontation with the surface 50 of the central web 20 of the jaw 16. The gripping surface means 46 may be constituted by the heads of respective bolts threaded into respective openings in the jaw 34. The presently preferred gripping surface means is shown in detail in FIGS. 11-13.

The crank link plate includes a lobe 56 which extends generally longitudinally inwardly.

The clamp 10 further includes a generally trapezoidal link plate 58 having two pivot axes 60, 62 which are parallel to one another and lie in the plane of this link. Of these, the axis 60 is adjacent and parallel to the narrower base 63 of the trapezoid and the axis 62 is adjacent and parallel to the broader base 65 of the trapezoid. The laterally outer edge 68 of the link plate 58 is perpendicular to the bases 63, 65 and the laterally inner edge 70 extends at an angle, except for having flat bosses 72, 74 coincident with the axes 60, 62.

Each of the bases 63, 65 of the link plate 58 is slotted, with the laterally outer one 64 being longer and located laterally in from the outer edge 68 by an amount equal to the corresponding lateral dimension of the outer edge bracket bar 12. The crank line plate lobe 56 is received in the slot 64. A bolt, nut and washer assembly 76 is installed along the pivot axis 60 through corresponding openings in the trapezoidal link plate 58 and the crank link lobe 56. The axis 60 passes through the lobe 56 longitudinally inwardly of the jaw 34 and above the back of the jaw 34, but only about half-way along the length of the crank link plate. Thus, a substantial portion of the lobe 56 lies in the slot 64, since the axis 60 lies near the mouth of the slot 64. The slot 64 is laterally only slightly broader than the corresponding lobe dimension, so the fit is free but snug and not binding.

A bolt, nut and washer assembly 78 is installed along the pivot axis 62 through corresponding openings in the trapezoidal link plate 58 near the broader base 65. A portion of the shank of the bolt of assembly 78 intersects the shorter slot 66 near the base 66, thus providing an anchor point 82 that is located laterally intermediate the bases and free ends of the clamp jaws.

The structure depicted also includes a link 84, having a lower end positioned against the laterally outer face of the outer edge bracket 12 below the jaw 16, and pivoted thereto along a fourth laterally horizontal pivot axis 86, using a nut, bolt and washer assembly 88.

The upper end of the link 84 is positioned against the laterally outer side of the trapezoidal link plate 58 and pivoted thereto by having a corresponding opening through which the nut, bolt and washer assembly 78 is installed.

Desirably the clamp 10 is strengthened by a short link 90, with openings therethrough near opposite ends thereof. This link is placed against the laterally outer face of the outer edge bracket 12 and pivotally connected thereto by having the nut, bolt and washer assembly 32 installed through its corresponding opening. Similarly, the other end of the link 90 lies against the laterally outer edge, i.e. the broader base of the trapezoidal link plate 58 and is pivotally connected thereto by having the nut, bolt and washer assembly 76 installed through its corresponding opening.

In use, the clamp 10 is installed on the outer edge region of a broken conveyor belt near the break, with the jaws open. A pull on the anchor point 82 in the direction of the arrow 92 and pounding on the clamp will pull the jaw 34 down tight against the belt, so that the belt is clamped between the jaws 16 and 34. The knurling on the jaw 34 guards against slippage.

The clamp 10 can be loosened and freed from gripping the respective edge region of the belt, by relaxing the pull on the anchor point 82, and, if necessary, pounding on the trapezoidal link plate 58 anvil region at 94.

The clamp of the present invention is preferably constructed of steel plate and steel nut, bolt and washer assemblies. A steel chain 96 may be secured at the anchor point 82 by having an end link journalled on the corresponding bolt shank.

In the preferred embodiment described, the clamp 10 is believed to have several unique features, including the guided association of the crank like lobe with the sides of the trapezoidal link plate slot in which it is received, providing structural stability against clamp bending; reinforcement provided by the additional link 90, also providing structural stability against clamp bending; the provision on the link 58 of an anvil region 94 to facilitate freeing the clamp from the belt; the placement of the anchor point 82 laterally inwardly so that it is centered so as to be located laterally half-way across the gripping "footprint" of the clamp; and desirably the clamp jaws are longer longitudinally of the belt, to allow a better grip without causing belt damage than is possible in the prior art where a clamp anchor point is substantially laterally off-center compared to the clamp footprint center line.

Figure 8:
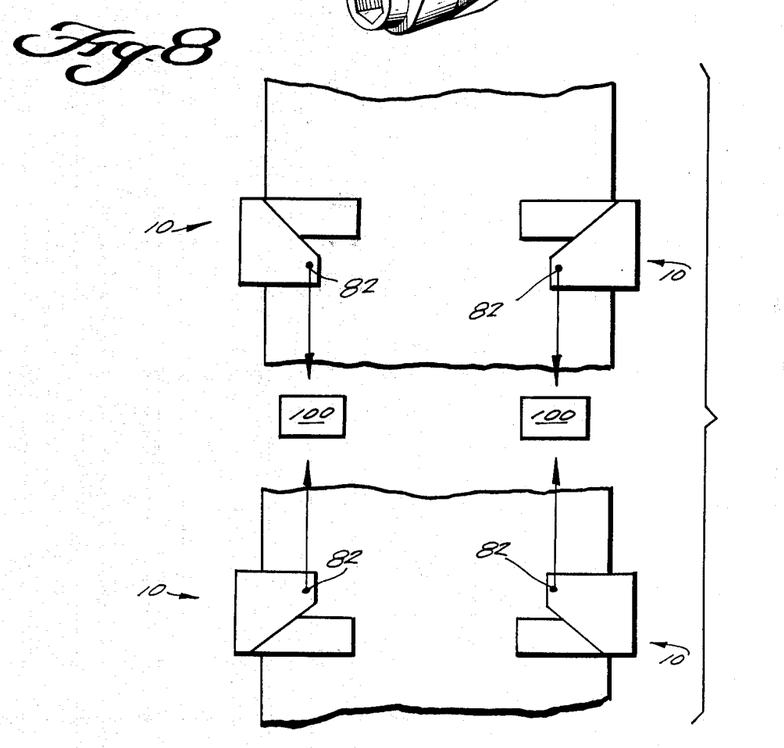
FIG. 8 is a diagrammatic top plan view, for comparison with FIG. 3 of a broken conveyor belt being repaired using a set of two pairs of the clamps of the present invention.

Although one clamp 19 is shown, it should be apparent that such clamps are generally intended to be used in sets of two pairs, in which in each pair, one clamp is a mirror image of the other. A typical installation is shown in FIG. 8. In this figure, one pair of clamps 10 is installed on the respective left edge portions of the belt on opposite sides of the break, and the other pair of clamps 10 is installed on the respective right edge portions of the belt on opposite sides of the break. When the respective belt edges are fully received between the respective clamp jaws, the respective belt edges abut the respective clamp outer edge bracket laterally inner faces. Accordingly, in each pair of clamps 10, the anchor points 82 are substantially in longitudinal alignment. The chains attached to each pair of anchor points can be simultaneously pulled longitudinally in the direction of the arrows, using one, two or four pulling device(s) such as a portable winch, mobile equipment such as tractors, or pressurized fluid-activated expansible/contractile piston/cylinder arrangements, or the like generically illustrated at 100. Once the broken ends have thus been brought into adjacency, the actual reconnection may be done by any convenient mechanism and method as in the prior art.

Of course, the clamps 10 may be used in sets of two, one at the right and the other at the left if only one belt broken end is being pulled. The clamps are designed to be pulled with a steady pull of about 2000 pounds each, without permanent bending or slipping and without tearing, cutting or rupturing the belt. Further, the clamps may be used singly where pulling loads are relatively low, for instance at the time of initial installation of a belt.

The aligned loading provided by having the anchor points 82 on line with the clamp footprint centers virtually eliminates twisting of the belt and thus eliminates a cause of rupture and tearing inherent in use of prior art edge clamps (as described above with regard to FIGS. 2 and 3).

The nut, bolt and washer assemblies described above are representative of any equivalent pivot connection, journal and spacer means.

It is not essential that the plate 58 be mathematically trapezoidal in shape. It is referred to hereinabove by its approximate shape as a matter of convenience. It may more generically be termed an anchor point link plate.

Figure 9:
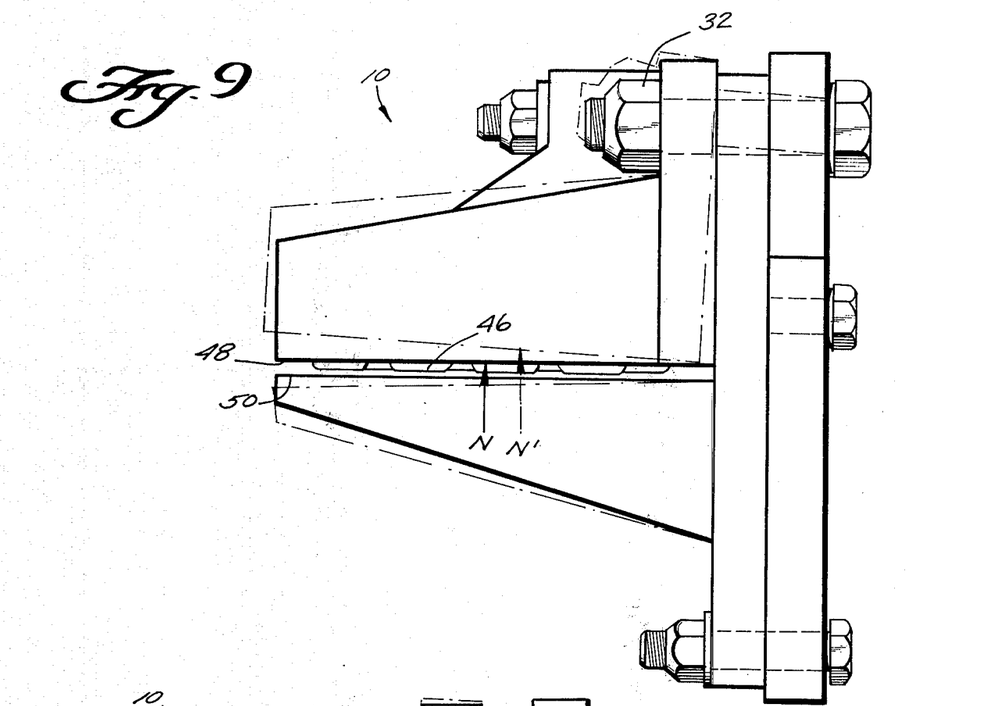
FIG. 9 is a schematic illustration of how loading on the clamp of the invention (dashed lines) would be adversely affected if its jaw gripping surfaces were parallel in the unloaded condition (full lines)
Figure 10:
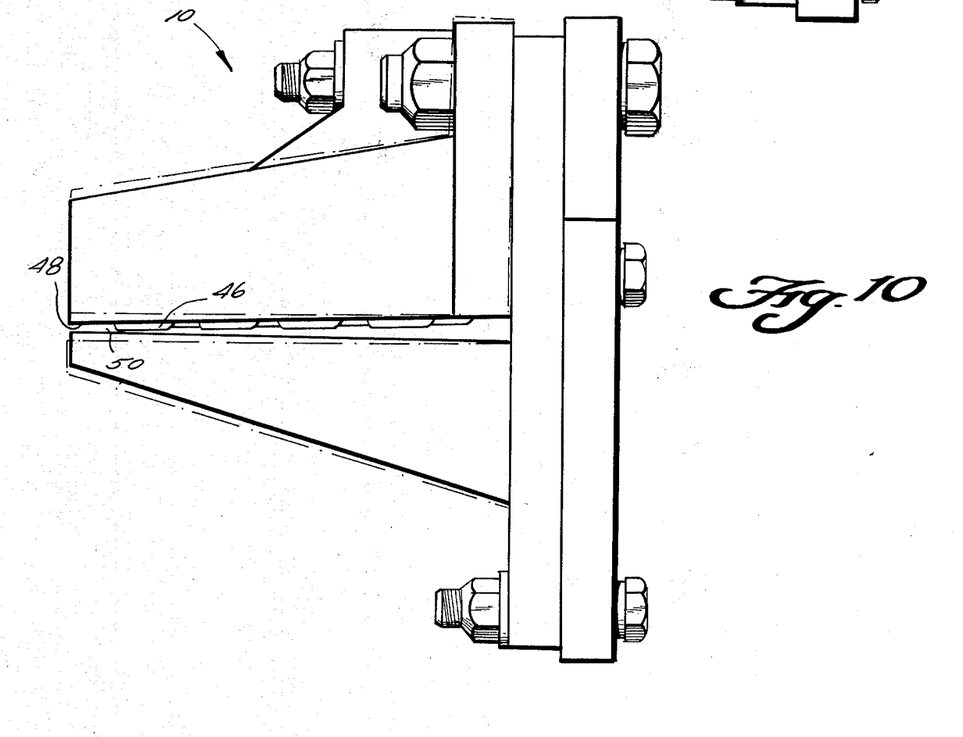
FIG. 10 is a similar schematic illustration of how the problem portrayed in FIG. 9 is overcome by making the clamp jaw gripping surfaces slightly non-parallel in the unloaded condition (full lines), so that when the clamp is loaded (dashed lines) the gripping surfaces become parallel to uniformly grip the belt between them.

Referring now to FIGS. 9 and 10, if the clamp 10 of the invention were constructed so that in a closed, unloaded condition (as shown in full lines in FIG. 9), its gripping surfaces 48, 50 were parallel, then, when a belt (not illustrated) is gripped between the jaws with the amount of force needed for pulling on the belt to make a repair, the clamp jaws and bolt 32 will deflect so that the tips of the clamp jaws are no longer compressing the belt between them. The deflection shifts the effective center of gripping force from the center toward the bases of the clamp jaws, e.g. from full lines arrow N to the dashed line arrow N' illustrated in FIG. 9.

To overcome this tendency, by preference, the clamp 10 is constructed as illustrated in FIG. 10, so that the jaw surfaces 48, 50, when the clamp is closed but unloaded, are slightly non-parallel, i.e. are slightly closer toward the jaw tips (as shown in full lines). Accordingly, when the clamp 10 is loaded by gripping a belt (not illustrated) between its jaws and being pulled, the clamp parts deflect to their dashed-line positions causing even gripping with a properly centered gripping effect.

Figures 11, 12, 13:
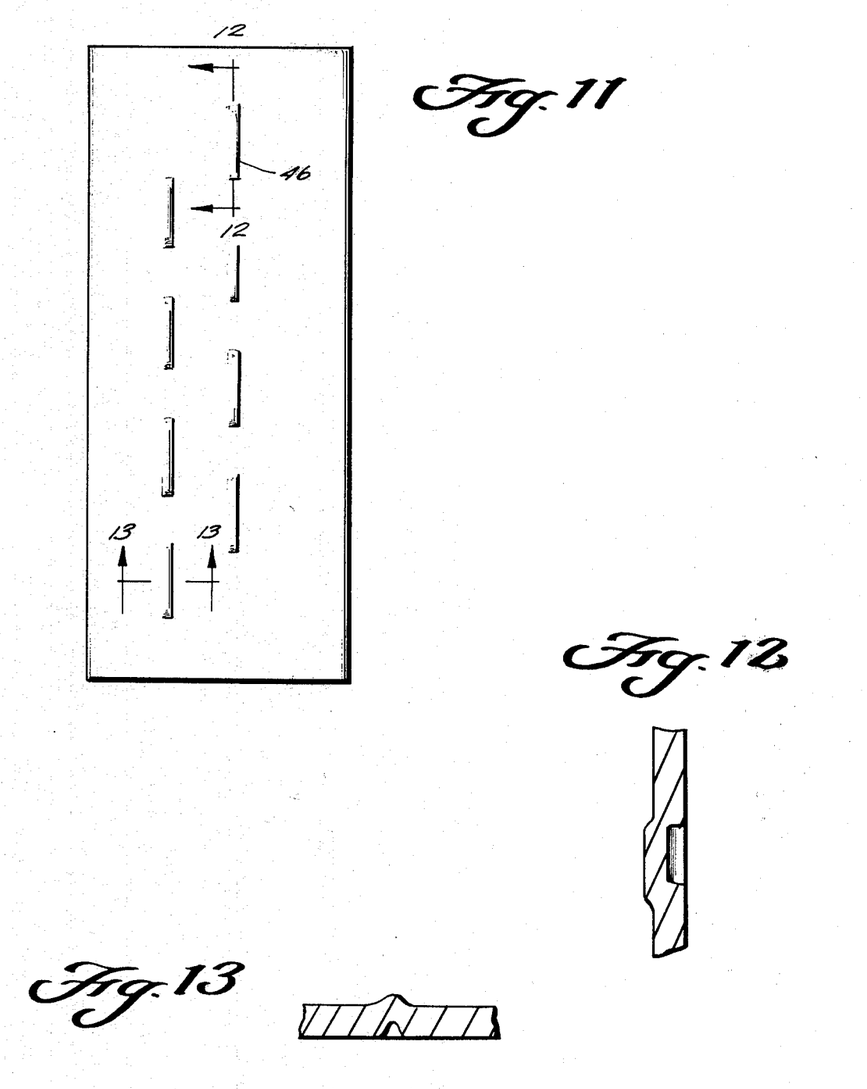
FIG. 11 is a bottom plan view of the upper jaw showing preferred dimpling to provide gripping surface means.
FIGS. 12 and 13 are fragmentary cross-sectional views on lines 12—12 and 13—13 of FIG. 11.

Although bolt heads may be used to provide knurling 46 on the upper jaw gripping surface, the presently preferred knurling is provided by dimpling the upper jaw as shown in FIGS. 11-13.

It should now be apparent that the clamp for repair of separation in conveyor belt as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. In a self-setting belt repair edge clamp of the type having a first jaw fixed on a bracket, a second jaw fixed on a crank link, there being means pivotally securing the second jaw on the bracket, and a pair of operator links having proximal ends pivotally secured together on an anchor point axis, with the distal end of one being pivotally secured to the bracket and the distal end of the other being pivotally secured to the crank link with such an offset from where the second jaw is pivotally secured to the bracket, that when a pulling force is applied to the anchor point axis in a sense to pull the anchor point axis away from the bracket, the second jaw is moved into confronting, clamping relation with the first jaw so that a thickness of conveyor belt or the like inserted between the jaws prior to exertion of said pulling force becomes clamped tightly between the jaws, the improvement wherein:

said jaws are extensive laterally of the bracket so as to provide a clamping footprint of substantial width;

said other operator link extending laterally in a substantial distance and including an anchor point constructed and arranged for the attachment for means for exerting said pulling force, and anchor point being disposed substantially laterally midway along said jaws, so that said pulling force may be exerted effectively centrally of the clamping footprint; and said other operator link including a guide slot and said crank link includes a lobe snuggly received in the guide slot when the second jaw is in confronting clamping relation with the first jaw, for lobe-in-slot cooperation to prevent bending of the clamp as said pulling force is exerted.

2. The improved clamp of claim 1, wherein:
said second jaw is faced with belt-gripping surface means.

3. In a self-setting belt repair edge clamp of the type having a first jaw fixed on a bracket, a second jaw fixed on a crank link, there being means pivotally securing the second jaw on the bracket, and a pair of operator links having proximal ends pivotally secured together on an anchor point axis, with the distal end of one being pivotally secured to the bracket and the distal end of the other being pivotally secured to the crank link with such an offset from where the second jaw is pivotally secured to the bracket, that when a pulling force is applied to the anchor point axis in a sense to pull the anchor point axis away from the bracket, the second jaw is moved into confronting, clamping relation with the first jaw so that a thickness of conveyor belt or the like inserted between the jaws prior to exertion of said pulling force becomes clamped tightly between the jaws, the improvement wherein:

said jaws are extensive laterally of the bracket so as to provide a clamping footprint of substantial width;

said other operator link extending laterally in a substantial distance and including an anchor point constructed and arranged for the attachment for means for exerting said pulling force, and anchor point being disposed substantially laterally midway along said jaws, so that said pulling force may be exerted effectively centrally of the clamping footprint; and a reinforcing link having one end pivoted to said other operator link together with said crank link and another end pivoted to said bracket together with said second jaw.

4. The improved clamp of claim 1, wherein:
said other operator link is an extensive plate having an anvil region located laterally between said anchor point and said one operator link, so that when said pulling force is relaxed, said anvil region may be struck in order to open said clamp.

5. In a self-setting belt repair edge claim of the type having a first jaw fixed on a bracket, a second jaw fixed on a crank link, there being means pivotally securing the second jaw on the bracket, and a pair of operator links having proximal ends pivotally secured together on an anchor point axis, with the distal end of one being pivotally secured to the bracket and the distal end of the other being pivotally secured to the crank link with such an offset from where the second jaw is pivotally secured to the bracket, that when a pulling force is applied to the anchor point axis in a sense to pull the anchor point axis away from the bracket, the second jaw is moved into confronting, clamping relation with the first jaw so that a thickness of conveyor belt or the like inserted between the jaws prior to exertion of said pulling force becomes clamped tightly between the jaws, the improvement wherein:

said jaws are extensive laterally of the bracket so as to provide a clamping footprint of substantial width;

said other operator link extending laterally in a substantial distance and including an anchor point constructed and arranged for the attachment for means for exerting said pulling force, and anchor point being disposed substantially laterally midway along said jaws, so that said pulling force may be exerted effectively centrally of the clamping footprint; and said other operator link being an extensive plate having an anvil region located laterally between said anchor point and said one operator link, so that when said pulling force is relaxed, said anvil region may be struck in order to open said clamp;

said other operator link including a guide slot and said crank link includes a lobe snuggly received in the guide slot when the second jaw is in confronting clamping relation with the first jaw, for lobe-in-slot cooperation to prevent bending of the clamp as said pulling force is exerted;

said other operator link being generally trapezoidal, with a broader base adjacent said anchor point and said anvil region, and a narrower base through which said guide slot opens.

* * * * *